(12) United States Patent
Kemeny et al.

(10) Patent No.: US 7,062,675 B1
(45) Date of Patent: Jun. 13, 2006

(54) DATA STORAGE CACHE SYSTEM SHUTDOWN SCHEME

(75) Inventors: John N. Kemeny, Westford, MA (US); Jun Ohama, Mendon, MA (US); Douglas Sullivan, Milford, MA (US); Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 362 days.

(21) Appl. No.: 10/179,113

(22) Filed: Jun. 25, 2002

(51) Int. Cl.
*G06F 11/00* (2006.01)
(52) U.S. Cl. .................... 714/15; 711/135; 711/138
(58) Field of Classification Search .............. 714/24, 714/5
See application file for complete search history.

(56) References Cited

U.S. PATENT DOCUMENTS

| | | | | |
|---|---|---|---|---|
| 5,339,407 A | * | 8/1994 | Goldman et al. | 714/24 |
| 5,361,267 A | * | 11/1994 | Godiwala et al. | 714/755 |
| 5,448,719 A | * | 9/1995 | Schultz et al. | 714/5 |
| 5,588,110 A | * | 12/1996 | DeKoning et al. | 714/5 |
| 5,761,406 A | * | 6/1998 | Kobayashi et al. | 714/24 |
| 5,828,823 A | * | 10/1998 | Byers et al. | 714/24 |
| 5,845,326 A | * | 12/1998 | Hirayama et al. | 711/135 |
| 6,182,198 B1 | * | 1/2001 | Hubis et al. | 711/162 |
| 6,195,754 B1 | * | 2/2001 | Jardine et al. | 713/324 |
| 6,205,521 B1 | * | 3/2001 | Schumann | 711/144 |
| 6,434,673 B1 | * | 8/2002 | Palanca et al. | 711/133 |
| 2003/0200394 A1 | * | 10/2003 | Ashmore et al. | 711/119 |
| 2003/0212865 A1 | * | 11/2003 | Hicken et al. | 711/135 |

* cited by examiner

*Primary Examiner*—Robert Beausoliel
*Assistant Examiner*—Philip Guyton
(74) *Attorney, Agent, or Firm*—BainwoodHuang; David E. Huang, Esq.

(57) ABSTRACT

In a storage system including a write-back cache, dirty data can be flushed from the cache while a controller continues to service host I/O requests. A controller is capable of flushing all the dirty data in the cache to a storage device in response to an indication to do so, such as an indication of impending failure. The controller is further capable of responding to I/O requests from the host during the flushing of the dirty data. In particular, the controller is capable of responding to write requests from the host system by storing data on the storage device during the flushing of the dirty data.

18 Claims, 9 Drawing Sheets

DATA STORAGE CACHE SYSTEM SHUTDOWN SCHEME

FIELD OF THE INVENTION

The present invention relates generally to caches, and more particularly to techniques for flushing a cache during a cache system shutdown.

BACKGROUND OF THE INVENTION

In today's computing environments, data storage systems that include large arrays of disk storage can be connected to one or a number of host processing systems. These data storage systems may store very large amounts, for example terabytes, of data. It is important that this data not be compromised, and that it remains accessible to applications running on the host processing systems, because if an event prevents a host system from accessing the data on the storage system, the applications running on the host system can cease to function. This can have devastating consequences where the application is, for instance, a database application supporting a financial institution. Various mechanisms are therefore employed in data storage systems to prevent loss or inaccessibility of data.

Many storage systems include caches, usually consisting of volatile RAM, for temporarily storing blocks of disk data. The data stored in the cache is more quickly accessible by the host systems, thereby providing significant performance gains. In a particular caching implementation known as "write-back" caching, when the host system writes data to the storage system, the storage system writes the data to the cache but does not immediately write the data to the disk array. The data remains accessible in the cache, and is not written back to the disk array until the cache location is needed for storage of a different block of disk data. Performance advantages are achieved by reducing the number of relatively time consuming accesses to the disk array.

Such write-back caching systems are vulnerable in a failure situation, since data that has been written to the cache may not yet be stored on the disk array. If the cache system fails, the cached data may be lost. Upon recovery, the contents of the disk array will not reflect the most recent application updates. This can cause an application to malfunction or fail. Mechanisms have been developed in order to avoid this problem. For example, many storage systems contain uninterruptible power supplies or batteries that allow these systems to continue to operate for a limited period of time after a line power failure. Upon notification of an impending failure, dirty data resident in the cache is "flushed" to the disk array—that is, all dirty data is written back to the disk array. During the time that dirty data is being flushed to the disk array, all I/O activity to and from the host system is halted in order that the flush can be completed.

The halting of I/O activity to and from the host system is disadvantageous in that it can cause applications executing on the host systems to fail. This is particularly deleterious in situations where the line power recovers before back-up power runs out. It is very often the case that line power is lost for only a few seconds. Thus, the currently known cache flushing mechanisms can needlessly cause applications to fail. It would be advantageous to provide a cache flushing mechanism that avoids these shortcomings.

SUMMARY OF THE INVENTION

In accordance with the principles of the invention, in a storage system including a cache, dirty data can be flushed from the cache while a controller continues to service host I/O requests.

According to one embodiment, a controller is capable of responding to write requests from a host to cause write data from the host to be stored in the cache as dirty data that has not yet been written to a storage device. The controller is capable of flushing all the dirty data in the cache to the storage device in response to an indication to do so. The controller is further capable of responding to I/O requests from the host system by causing data to be transferred to or from the storage device during the flushing of the dirty data.

More specifically, the controller is capable of responding during the flushing of the dirty data to a host write request to a location in the cache that is not marked as dirty by invalidating the location in the cache and re-directing the host write request such that data associated with the host write request is written to the storage device and not to the cache. The controller is further capable of responding during the flushing of the dirty data to a host write request to a location in the cache that is marked as dirty by writing data associated with the host write request to the dirty location in the cache. The controller is also capable of responding during the flushing of the dirty data to a host write request that misses the cache by re-directing the host write request such that the data is written to the storage device and not to the cache.

The controller may be further responsive to a throttle indication by delaying response times to host requests. This functionality is advantageous to ensure that the time spent responding to host write requests does not prevent the complete flushing of the dirty data within a given timeframe.

Similar methods and program products are provided. The invention is advantageously employed in a storage system in that loss of data is prevented during an impending failure, while host I/O activity can continue, thereby decreasing the likelihood that applications running on the host will fail. Impending failures often fail to materialize. The employment of the invention helps to make such non-materializing impending failures transparent to applications running on the host.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
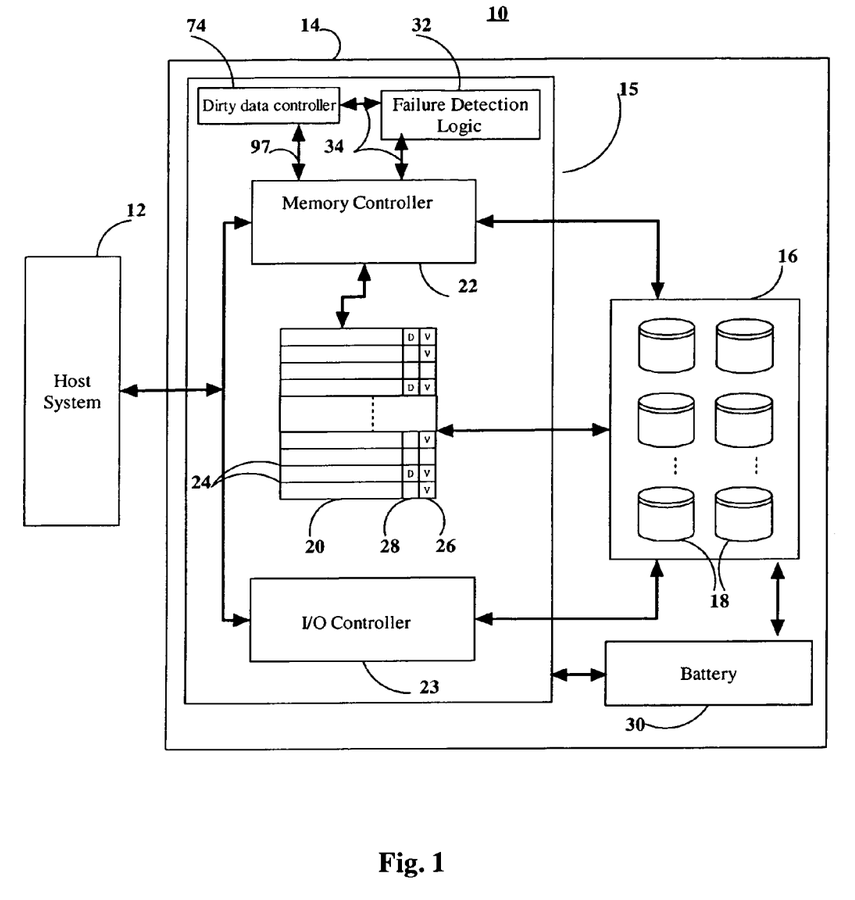
FIG. 1 is a schematic representation of a host system and storage system. The storage system includes a cache system which operates in accordance with the invention.
Figure 2A:
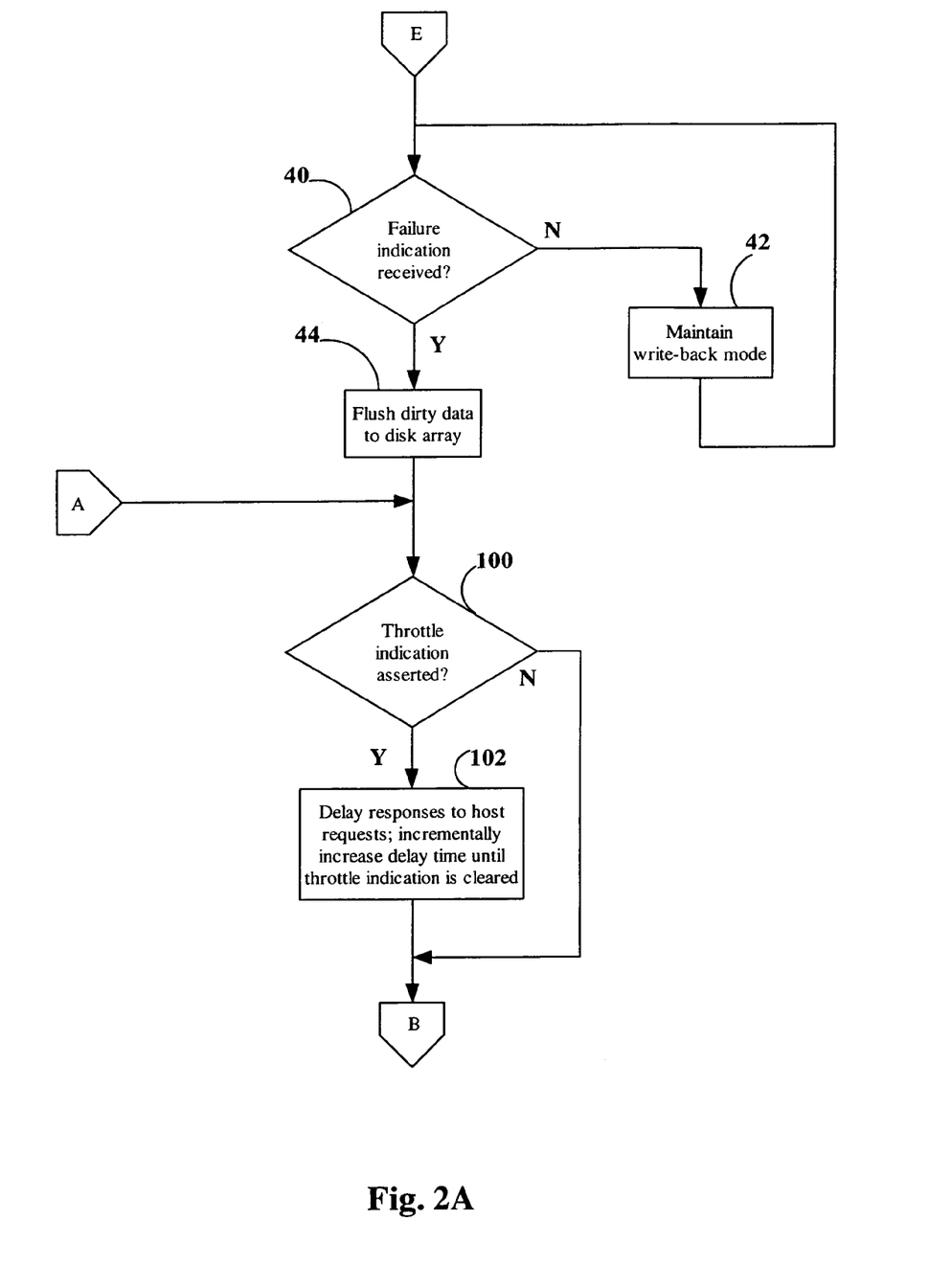
FIGS. 2A–2D is a flow diagram representing the operation of the memory controller of FIG. 1 in accordance with the invention.
Figure 2B:
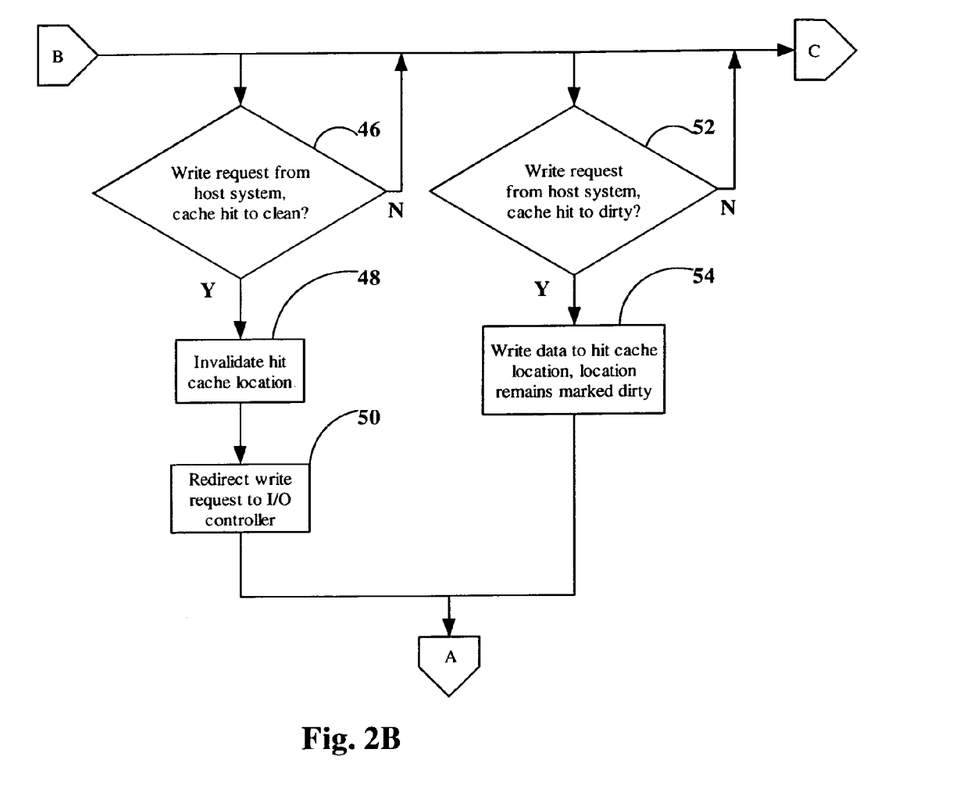
Figure 2C:
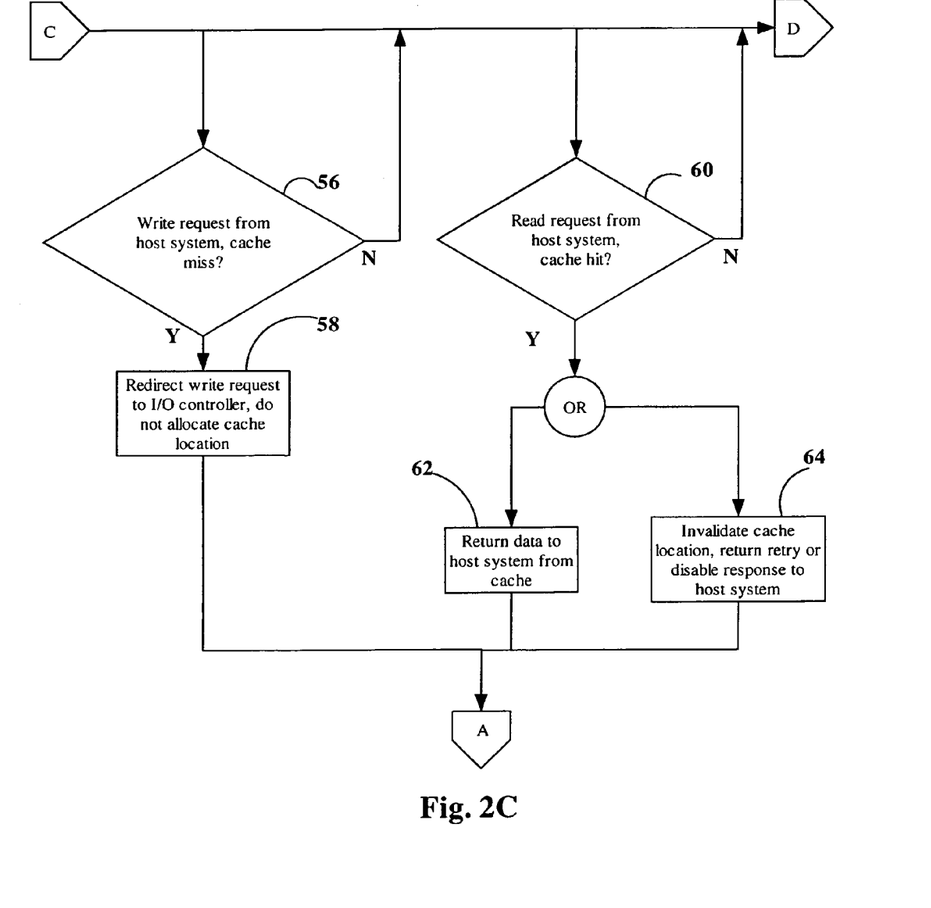
Figure 2D:
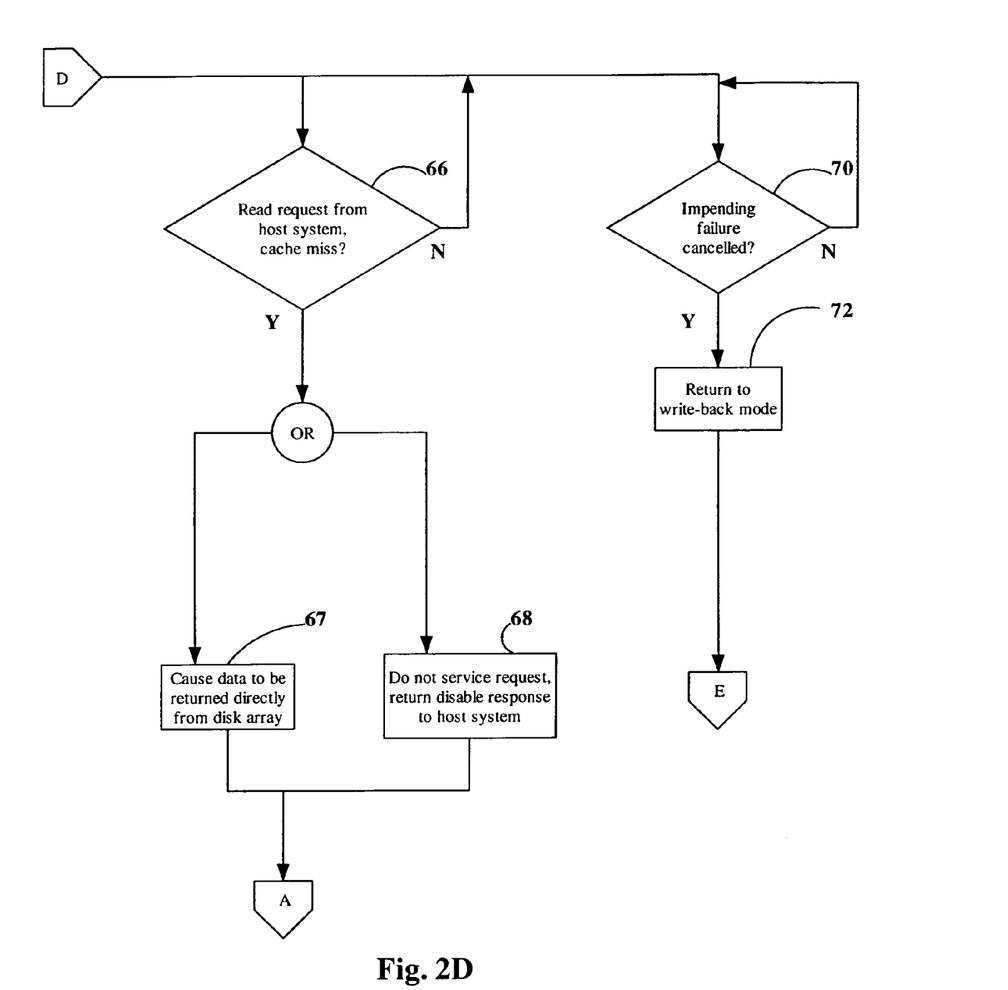

In FIG. 1 there is shown a computing system 10 wherein a host system 12 is coupled to a storage system 14. The storage system 14 includes a cache system 15 and a disk array 16. The disk array 16 is made up of banks of disk drives 18. The disk array 16 is in communication with a disk cache 20. A memory controller 22 is coupled between the disk array 16, the disk cache 20, the host system 12, and an I/O controller 23. The I/O controller 23 is further coupled between the disk array 16 and the host system 12. The disk cache 20 consists of memory, such as dynamic random access memory. Data can be accessed more quickly from the higher speed disk cache 20 than from the disk array 16. The capacity of the disk cache 20 is generally much smaller than the capacity of the disk array 16. For example, the disk array 16 may be capable of storing many terabytes of data, whereas the disk cache 20 may be capable of storing 512 gigabytes of data. The disk cache 20 is employed to store data read from the disk array 16 so that subsequent accesses to the same data can be returned to the host system 12 more quickly.

The disk cache 20, when operating in normal caching mode, generally operates as follows. When the host system 12 needs to transfer data to or from the storage system 14, the host system 12 issues a host I/O request to the storage system 14. When the host system 12 needs to read data from the storage system 14, the host system 12 sends a read request command to the storage system 14. The memory controller 22 responds to the read request by first checking to see if the requested data resides in the disk cache 20. If it does, the read access is referred to as a "hit" and the data is returned from the disk cache 20 to the host system 12. If the requested data does not reside in the disk cache 20, the read access is referred to as a "miss". The memory controller 22 will then forward the read request to the I/O controller 23. The I/O controller 23 will cause the requested data to be retrieved from the disk array 16 and returned to the host system 12. The memory controller 22 will cause the data to be stored in the disk cache 20. The disk cache 20 includes locations 24 for storing blocks of data as they are read from the disk array 16. As a location 24 is filled with data, the controller 22 sets a valid bit 26 for the location.

Eventually the disk cache 20 will become full of valid data. In this case, if the host system 12 requests data that does not reside in the disk cache 20, or in other words the access is a "miss", then the memory controller 22 and I/O controller 23 will cause the requested data to be retrieved from the disk array 16 and returned to the host system 12, and the memory controller 22 will cause a location 24 in the disk cache 20 to be re-allocated for storage of the requested data. The data previously residing at the location 24 is discarded. Any number of known algorithms can be used by the controller 22 to select which cache location 24 should be re-allocated. For example, the memory controller 22 may allocate the location that was least recently used (LRU), or the controller 22 may allocate locations on a first-in-first-out basis (FIFO), or by random replacement.

Data writes by the host system 12 to the storage system 14 are handled in accordance with a caching architecture known as "write-back". When operating in write-back mode, the memory controller 22 responds to a write request command from the host system 12 by causing the data to be written to the disk cache 20 only—not to the disk array 16. The location 24 in the disk cache 20 to which the data was written is marked with a "dirty" bit 28. The dirty bit 28 indicates that the data stored in the cache location 24 is not the same as the data stored in the corresponding disk array 16 location. In other words, the most recently updated version of the data resides in the cache 20, but not on the disk array 16. The cache location 24 whose dirty bit 28 is set is referred to as "dirty" and the data stored in the location 24 is referred to as "dirty data". If a write request from the host system 12 results in a cache miss, a cache location 24 is allocated, the data is written to the location 24, and the location is marked dirty, i.e. the dirty bit 28 for the location is set. If a write request from the host system 12 results in a cache hit to a clean (i.e. the dirty bit is not set) or invalid cache location 24, the contents of the cache location 24 are overwritten with the data and the location is marked dirty, i.e. the dirty bit 28 is set. If data is being written to a dirty cache location, the contents of the location is overwritten with the data and the location remains marked dirty.

Before the memory controller 22 can evict dirty data from a cache location 24 so that the location 24 can be used by another block of data (for example when a read or write miss occurs), the data being evicted must be written back to the disk array 16. In other words, when a cache read or write miss results in re-allocation of a dirty cache location 24 to a new disk block address, the data residing in the location 24 must be written back to the disk array 16 before the cache location 24 can be loaded with the new data. The write-back architecture is generally higher in performance than a write through architecture (wherein data is written to the cache and to the disk array at the same time) due to the fact that fewer relatively slow writes occur to the disk array 16.

It should be noted that, in accordance with the write back architecture, there are periods of time when the cache 20 contents do not match the disk array 16 contents—that is, dirty data that has been written to the cache 20 has not yet been committed to the disk array 16. This presents vulnerability in a failure situation. For instance, if any part of the cache system 15 malfunctions or fails, for example due to a power failure, then recently written uncommitted data can be lost. In accordance with the principles of the invention, when a failure indication is received by the memory controller 22, the uncommitted dirty data resident in the disk cache 20 is "flushed" to the disk array 16 in order to prevent loss of uncommitted data, while I/O requests from the host server 12 continue to be serviced.

The storage system 14 includes a battery 30 that provides battery back-up power to the storage system 14 for a limited period of time after a power failure. Failure detection logic 32 can detect failures such as a line power failure. When such a failure is detected, the failure detection logic 32 causes the battery back-up power to turn on, and asserts a failure indication signal 34 to the memory controller 22. The memory controller 22 responds to the failure indication signal 34 by flushing the dirty data from the cache 20, while continuing to service host I/O requests. The failure detection logic 32 can also be programmed to assert the failure indication signal 34 on command. This may be useful for diagnostic purposes or for certain particular application performance purposes.

FIGS. 2A–2D represents the operation of the memory controller 22 in accordance with the invention. As long as no failure indication or command to flush the cache is received from the failure detection logic 32 via assertion of the failure indication signal 34 (step 40) the memory controller 22 continues to operate the cache 20 in normal write-back mode as previously described (step 42). However, when an indication of an impending failure or a command to flush the cache is received by the memory controller 22 (step 40), the memory controller 22 begins "flushing" the dirty data from the disk cache 20 to the disk array 16 (step 44). That is, the memory controller 22 successively identifies cache locations 24 for which the dirty bit 28 is set. For each such location 24, the memory controller 22 sends a write request to the I/O controller 23. The I/O controller 23 writes the dirty data to the disk array 16 and returns a write response to the memory controller 22. The memory controller 22 can then mark the cache location 24 clean (i.e. the valid bit 26 is set and the dirty bit 28 is not set) or invalidate it (i.e. the valid bit is not set). The process of flushing the dirty data continues during the remaining steps to be described until the failure indication signal 34 is cleared or until the cache is fully flushed.

Meanwhile, the memory controller 22 continues to respond to I/O requests from the host by essentially switching from a write-back to a form of write-through caching mode. When a write request command is received from the host system 12, and the write request command results in a hit to a clean cache location (step 46), then the cache location is invalidated (step 48) and the write request is re-directed to the I/O controller 23, which causes the data to be written directly to the disk array 16 (step 50).

When a write request is received from the host system 12 and the write request command results in a hit to a dirty cache location (step 52), then the cache location is overwritten with the new data and the location remains marked dirty (step 54). This is done for coherency reasons. A write hit to a dirty cache location indicates that the memory controller 22 has not yet caused the dirty data in that cache location to be written back to the disk array 16 during the flushing operation. The host system write request command results in a further update of this cache location and, thus, the cache must be written so that the memory controller 22 will write back the most currently written data during the flushing process.

When a write request is received from the host system 12 and the write request command results in a miss to the cache (step 56), then the write request is re-directed to the I/O controller 23, which causes the data to be written directly to the disk array 16 (step 58). No cache line is allocated for this write.

Read requests received from the host system 12 may be handled in a few different ways. Preferentially, a read request command that results in a cache hit (step 60) may be handled by the memory controller 22 by causing the cached data to be returned to the host system 12 (step 62). Alternatively, the memory controller 22 may invalidate the location that was hit and return a retry or disable response to the host system 12 (step 64). A retry response indicates to the host system 12 that the read request command should be re-issued at a later time. A disable response indicates to the host system 12 that the read request command will not be processed. Invalidating hit cache locations can be advantageous in helping to reserve power during an impending failure.

A read request command from the host system 12 that results in a cache miss (step 66) can also be handled in several different ways. Preferentially, the memory controller 22 redirects the read request command such that the data is returned directly from the disk array 16 (step 67). For example, the memory controller 22 may issue a particular retry response to the host system 12 which causes the host system 12 to re-issue a read request command that is serviced directly by the I/O controller 23. Alternatively, the read request command that results in a cache miss is not serviced. In this case, the memory controller 22 responds to read request commands that result in a cache miss with a "disabled" response (step 68).

During the flushing operation and while the memory controller 22 responds to requests from the host system 12 as previously described, the memory controller 22 continues to monitor the failure indication signal 34. If an impending failure does not materialize, for example if line power fails momentarily and then recovers, then the failure indication signal 34 will be deasserted. If the memory controller 22 senses that the failure indication signal 34 has been deasserted (step 70), then the memory controller 22 returns to normal write-back mode operation (step 72). As long as the failure indication signal 34 remains asserted, the memory controller 22 will continue the cache flushing operation (step 44) until all dirty data has been flushed from the cache, and will continue to respond to I/O requests from the host system 12 until the system is shut down.

In accordance with an embodiment of the invention, the amount of battery power available is known and thus the amount of time that battery power will be available after a line power failure can be calculated based on the power draw of the battery powered system. The number of locations in the cache 20 that can hold dirty data is limited based on the amount of time that battery power is available and based on the amount of time it takes to write a block of dirty data back to the disk array 16. This ensures that all dirty data can be flushed to the disk array 16 in the event of a failure, before battery power runs out. In accordance with the invention, continued I/O activity can be "throttled" during the flushing operation to ensure that the continued I/O activity will not prevent the cache flush from completing within the amount of battery power time available.

Figure 3A:
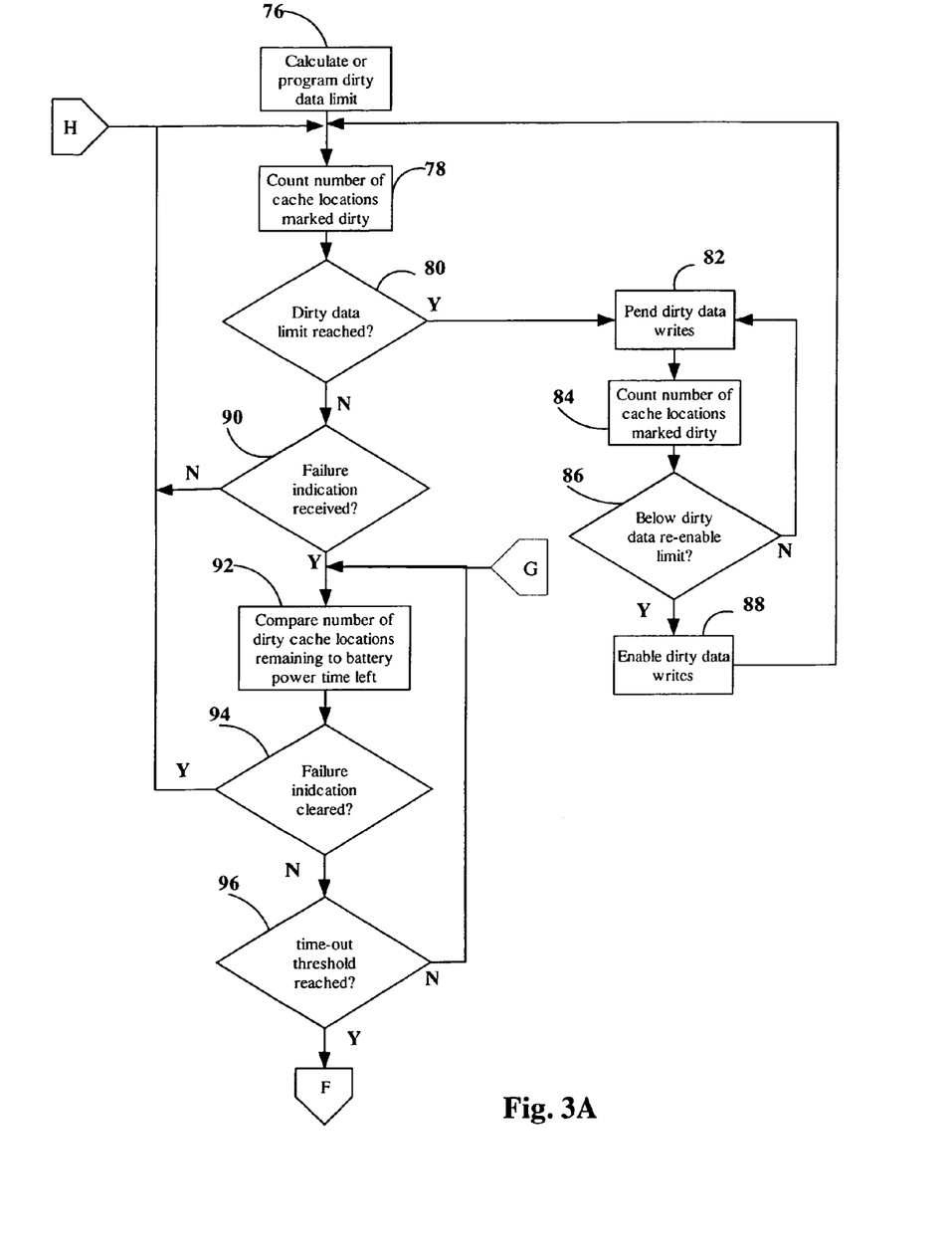
FIGS. 3A–3B is a flow diagram representing the operation of the dirty data controller of FIG. 1 in accordance with the invention.
Figure 3B:
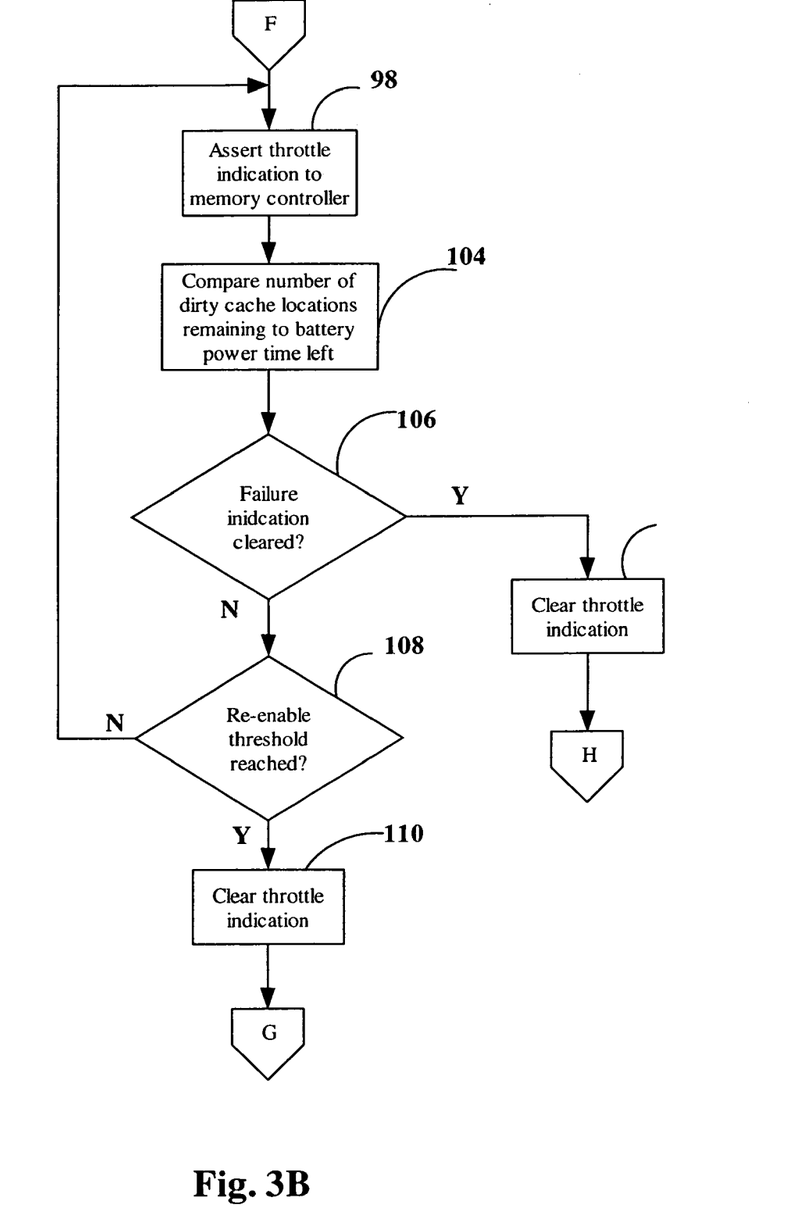

Accordingly, referring to FIGS. 1 and 3A–3B, a dirty data controller 74, which is herein shown as a separate controller but may also be included within the memory controller 22, sets a "dirty data limit" based on the amount of battery power time available divided by the amount of time it takes to write back the contents of a dirty cache location (step 76). This may be a hard set limit or may be programmable. A counter tracks the number of locations in the cache marked dirty at any given time (step 78). The content of the counter is compared to the dirty data limit. If the contents of the counter hits the dirty data limit (step 80), the memory controller 22 pends dirty data writes to the cache 20 (step 82). So, when write requests are received by the memory controller 22 from the host system 12, and the dirty data limit has been reached, the write requests are pended until a number of dirty cache locations have been evicted, making room for the new dirty data. The dirty data controller 74 continues to count the number of cache locations marked dirty (step 84.) This number will decrease during the time that writes are pended. Once the number of dirty cache locations remaining is below a dirty data re-enable limit (step 86), dirty data writes are again enabled (step 88). The dirty data re-enable limit may be lower than the dirty data limit in order to keep the dirty data controller from thrashing.

If a failure indication is received by the memory controller 22, the memory controller 22 follows the steps previously described in FIG. 2. Furthermore, as the cache is being flushed, the dirty data controller 74, which also receives the failure indication signal 34 (step 90), keeps track of the number of dirty cache locations left (by, for example, decrementing the counter as each location is flushed), and also keeps track of the amount of time that has passed since the failure indication was asserted (step 92). If the time it would take to flush the number of dirty locations remaining starts to approach the amount of battery power time remaining, then a time-out threshold is reached. If the failure indication has not yet been cleared (step 94), and the time-out threshold has been reached (step 96), then the dirty data controller sends a "throttle" indication 97 to the memory controller 22 (step 98), which causes the memory controller 22 to delay its response times to host I/O requests during the flushing operation. For example, if the memory controller 22 receives the throttle indication 97 from the dirty data controller (FIG. 2A step 100), it can set an initial delay time for response to all host I/O requests. Thus, any responses following requests received at steps 46, 52, 56, 60, and 66 will be delayed by the delay time. The memory controller 22 can incrementally increase this delay time until the throttle indication is cleared (FIG. 2A step 102). The host system 12 is unaware of the throttling, but as response times to host system 12 requests increase, the I/O request rate will naturally fall, allowing the memory controller more time to complete the flushing process.

The dirty data controller 74 continues to monitor the number of dirty cache locations remaining relative to the battery power left (step 104). If, during this time, the failure indication 34 is cleared (step 106), then the dirty data controller 74 clears the throttle indication (step 107) and returns to step 78 and operates in normal write-back mode. If the failure indication 34 has not been cleared, the dirty data controller 74 monitors the number of cache locations that remain marked dirty until a re-enable threshold is reached (step 108). The re-enable threshold may be lower than the time-out threshold in order to keep the dirty data controller 74 from thrashing. If the re-enable threshold has been reached, then the throttle indication is cleared (step 110) and the dirty data controller 74 continues to step 92 to compare the number of dirty cache locations to battery power left until either the time-out threshold is reached again or until the failure indication 34 has been cleared.

Figure 4:
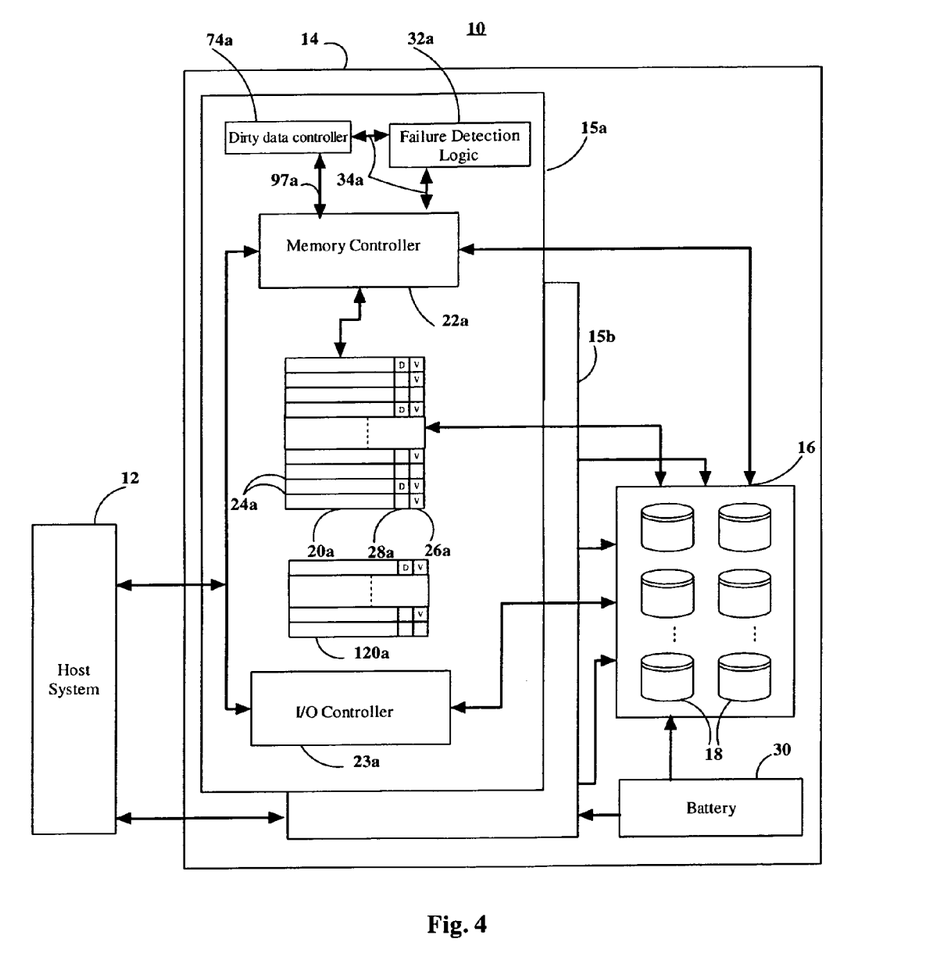
FIG. 4 is a schematic representation of a storage system including two cache systems, each cache system operating in accordance with the invention.
Figure 5:
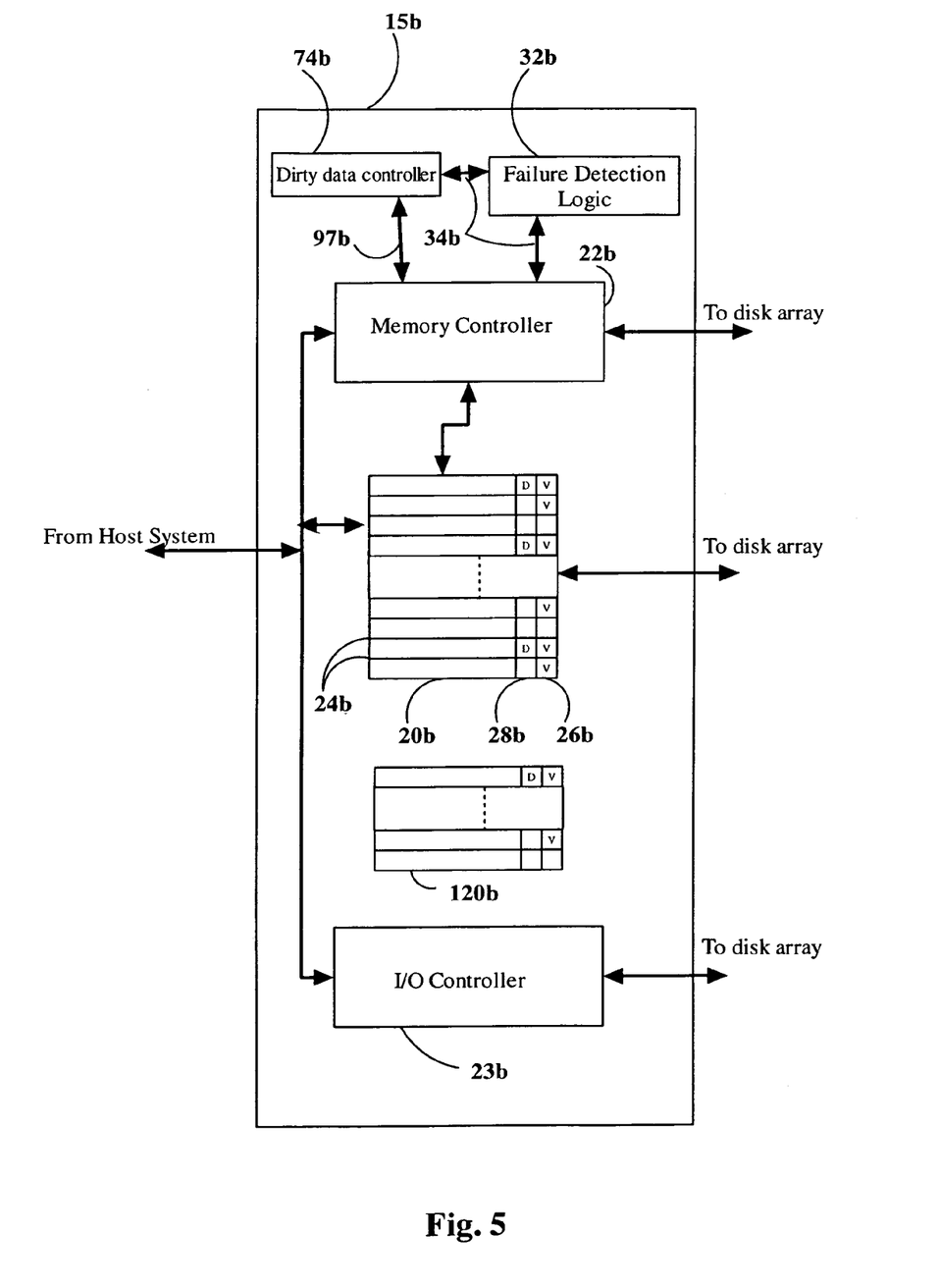
FIG. 5 is a schematic representation of the cache system 15$b$ of FIG. 4.

Referring now to FIGS. 4 and 5, there is shown a system in which a preferred embodiment of the invention is implemented. The system shown herein includes a pair of cache systems 15a and 15b. Each cache system includes the same elements as shown in FIG. 1, and corresponding elements are labeled "a" and "b". Each disk cache 20a and 20b further includes a mirror region 120a and 120b respectively. Dirty data that is stored in the disk cache 20a is also stored in the mirror region 120b of the cache 20b. Likewise, dirty data stored in the disk cache 20b is also stored in the mirror region 120a of the cache 20a. The size of the mirror regions 120a and 120b can be set for example in accordance with the "dirty data limit" as described above. The mirror regions 120a and 120b provide increased security against data loss. If for example the cache system 15a fails, dirty data can be recovered from the mirror region 120b and written back to the disk array 16, thereby avoiding loss of data. The storage subsystem 14 is thereby "highly available"—that is, it is resistant to data loss in the event of a failure of part of the system. However, once a failure of part of either of the cache systems 15a or 15b occurs, then only one copy of dirty data remains. Therefore, the invention as previously described is employed in the event of a failure of any part of either cache system 15a or 15b, so that the remaining copy of dirty data can be flushed to the disk array 16, removing any vulnerabilities associated with having a single copy of dirty cache data that does not match the disk array data. I/O requests from the host system 12 continue to be serviced during the cache flush as was previously described and shown in FIGS. 2 and 3.

Thus, when a failure occurs that causes any part of one of the cache systems 15a or 15b to fail, the process as shown in FIGS. 2 and 3 is employed by the other cache system. For example, if any sort of hardware or software failure occurs that causes any part of the cache system 15a to malfunction or fail, then the failure detection logic 32b will assert the failure indication signal 34b. The memory controller 22b in cache system 15b detects the failure indication (step 40) and begins "flushing" the dirty data from the disk cache 20b and the mirror region 120b (step 44). Further read or write requests from the host system 12 are handled as was previously described and shown in FIG. 2. Each cache system 15a and 15b may also include the dirty data controller 74 which operates as shown in FIG. 3.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a storage system, it will be apparent to the skilled artisan that the invention is applicable in any system that includes a write-back cache. It is applicable in systems including data storage apparatus other than a disk array, for example a dynamic random access memory. The control functions have been described generally herein, yet the skilled artisan will realize that the functionality of the described controllers may in fact be partitioned amongst several different controllers, or may all be included within a single controller. The skilled artisan will also realize that the caches generally described herein may be implemented in a variety of ways, including for example as direct mapped, set associative, or skewed associative caches. The implementations herein described employ a cache system within a storage system, but it will be clear to the skilled artisan that the cache system and disk array need not reside within the same system. The described control functions may be employed in hardware or in software, or in a combination of the two. The invention is also applicable in multi-level caching schemes including more than one cache. All such modifications are intended to fall within the scope of the following appended claims. Accordingly, the claims set forth below should be construed in view of the full breadth and spirit of the present invention as disclosed herein.

We claim:

1. Apparatus for storing data comprising:
   a cache for coupling between a host and a storage device;
   a controller capable of responding to write requests from the host to cause write data from the host to be stored in the cache as dirty data that has not yet been written to the storage device;
   the controller being capable of causing the dirty data in at least a portion of the cache to be flushed to the storage device in response to an indication to do so, the controller also being capable of responding to I/O requests from the host system to any cached location during the entirety of the flushing of the cache by causing some data to be transferred to or from the storage device and other data to be transferred to or from the cache during the flushing of the dirty data such that, upon completion of the flush, no dirty data remains in the portion of the cache flushed.

2. The apparatus of claim 1 wherein an I/O request from the host system is a write request, and wherein the controller is capable of responding to the write request by causing data to be stored on the storage device during the flushing of the dirty data.

3. The Apparatus of claim 1 wherein an I/O request from the host system is a write request to a location in the cache that is not marked as dirty, and wherein the controller is capable of responding to the write request by causing the location in the cache to be invalidated and re-directing the host write request such that data associated with the host write request is written to the storage device and not to the cache.

4. The apparatus of claim 3 wherein another I/O request from the host system is a write request to a location in the cache that is marked as dirty, and wherein the controller is capable of responding to the write request by causing data associated with the host write request to be written to the dirty location in the cache.

5. The apparatus of claim 4 wherein another I/O request from the host system is a write request that misses the cache, and wherein the controller is capable of responding to the write request by re-directing the write request such that the data is written to the storage device and not to the cache.

6. The apparatus of claim 1 further comprising:
a dirty data controller coupled to the controller, the dirty data controller being capable of sending a throttle indication to the controller, the controller being responsive to the throttle indication to delay response times to host I/O requests.

7. A method for storing data comprising:
responding to write requests from a host to cause write data from the host to be stored in a cache as dirty data that has not yet been written to a storage device;
flushing the dirty data in at least a portion of the cache to the storage device in response to an indication to do so;
during the flushing of the dirty data, responding to I/O requests from the host system to any cached location during the entirety of the flushing of the cache by causing some data to be transferred to or from the storage device and other data to be transferred to or from the cache during the flushing of the dirty data such that, upon completion of the flush, no dirty data remains in the portion of the cache flushed.

8. The method of claim 7 wherein the step of responding to I/O requests from the host system comprises responding to a write request by storing data on the storage device during the flushing of the dirty data.

9. The method of claim 7 wherein the step of responding to I/O requests from the host system comprises responding to a write request to a location in the cache that is not marked as dirty by invalidating the location in the cache and redirecting the host write request such that data associated with the host write request is written to the storage device and not to the cache.

10. The method of claim 9 wherein the step of responding to I/O requests from the host system further comprises responding to a write request to a location in the cache that is marked as dirty by writing data associated with the host write request to the dirty location in the cache.

11. The method of claim 10 wherein the step of responding to I/O requests from the host system further comprises responding to a write request that misses the cache by redirecting the host write request such that the data is written to the storage device and not to the cache.

12. The method of claim 7 further comprising:
responding to a throttle indication by delaying the response time to host I/O requests.

13. A program product comprising a computer readable medium having embodied therein a computer program for storing data for executing on a computer, the computer program comprising:
logic capable of responding to write requests from a host to cause write data from the host to be stored in a cache as dirty data that has not yet been written to a storage device;
the logic being capable of causing all the dirty data in at least a portion of the cache to be flushed to the storage device in response to an indication to do so, the logic also being capable of responding to I/O requests from the host system to any cached location during the entirety of the flushing of the cache by causing some data to be transferred to or from the storage device and other data to be transferred to or from the cache during the flushing of the dirty data such that, upon completion of the flush, no dirty data remains in the portion of the cache flushed.

14. The program product of claim 13 wherein an I/O request from the host system is a write request, and wherein the logic is capable of responding to the write request by causing data to be stored on the storage device during the flushing of the dirty data.

15. The program product of claim 13 wherein an I/O request from the host system is a write request to a location in the cache that is not marked as dirty, and wherein the logic is capable of responding to the write request by causing the location in the cache to be invalidated and redirecting the host write request such that data associated with the host write request is written to the storage device and not to the cache.

16. The program product of claim 15 wherein another I/O request from the host system is a write request to a location in the cache that is marked as dirty, and wherein the logic is capable of responding to the write request by causing data associated with the host write request to be written to the dirty location in the cache.

17. The program product of claim 16 wherein another I/O request from the host system is a write request that misses the cache, and wherein the logic is capable of responding to the write request by re-directing the write request such that the data is written to the storage device and not to the cache.

18. The program product of claim 13 wherein the logic is further capable of responding to a throttle indication to by delaying the response time to host requests.

* * * * *

UNITED STATES PATENT AND TRADEMARK OFFICE
CERTIFICATE OF CORRECTION

PATENT NO. : 7,062,675 B1 Page 1 of 1
APPLICATION NO. : 10/179113
DATED : June 13, 2006
INVENTOR(S) : John N. Kemeny et al.

It is certified that error appears in the above-identified patent and that said Letters Patent is hereby corrected as shown below:

Claim 11, Column 10, Line 7, "redirecting" should read --re-directing--.
Claim 15, Column 10, Line 40, "redirecting" should read --re-directing--.

Signed and Sealed this

Twelfth Day of September, 2006

JON W. DUDAS
*Director of the United States Patent and Trademark Office*